Oct. 4, 1938.          H. NILSON          2,131,815
              FLUID OPERATED POWER DEVICE
                   Filed Jan. 6, 1937
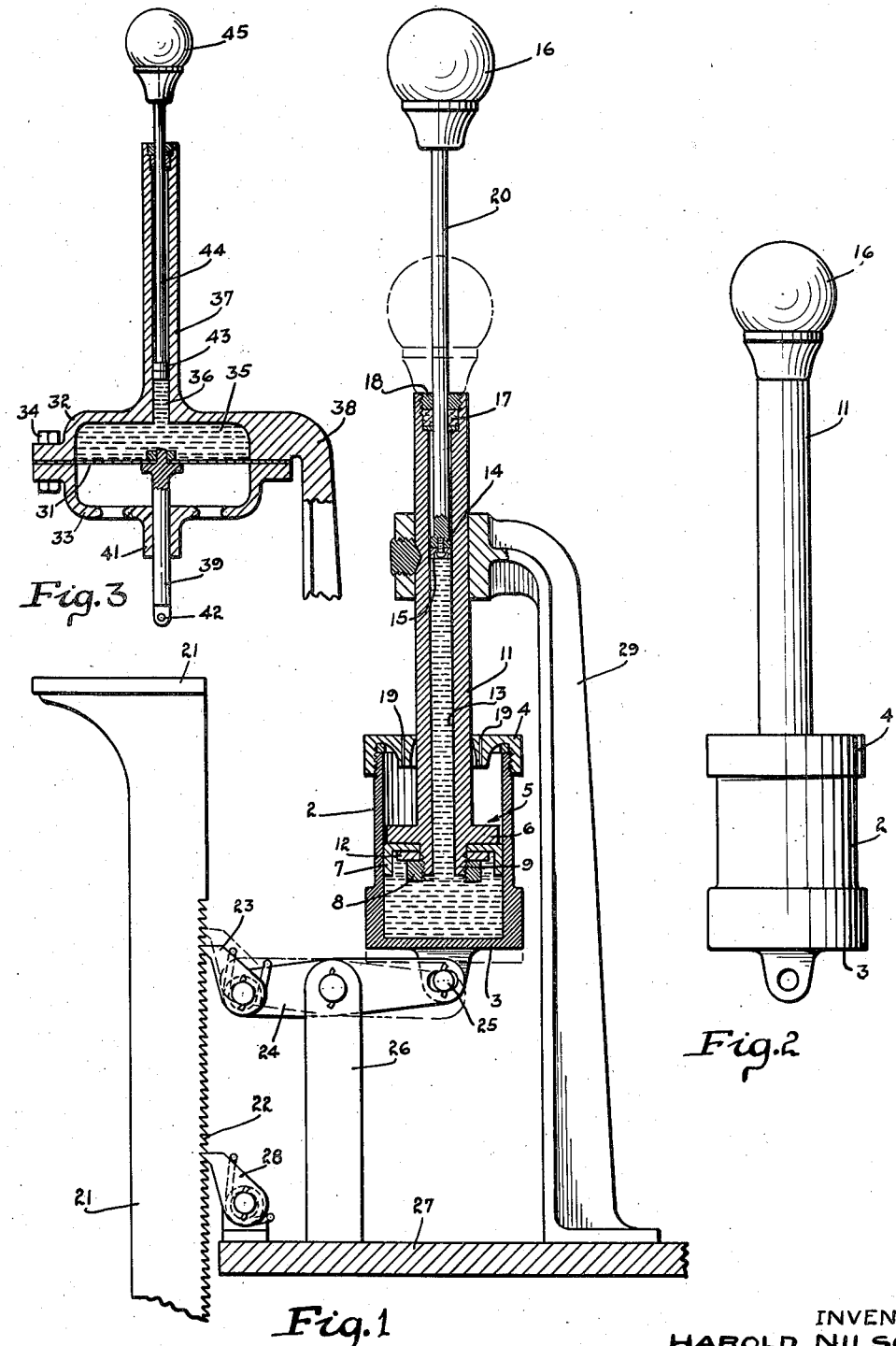
INVENTOR
HAROLD NILSON
BY
ATTORNEYS Patented Oct. 4, 1938

2,131,815

UNITED STATES PATENT OFFICE 2,131,815

FLUID OPERATED POWER DEVICE

Harold Nilson, Wayzata, Minn., assignor of one-third to John A. Edeby, Wayzata, Minn., and one-third to Emil Berglund, Minneapolis, Minn.

Application January 6, 1937, Serial No. 119,295

4 Claims. (Cl. 254—93)

This invention relates to new and useful improvements in power devices, and more particularly to a power device adapted to impart an intermittent motion to a driven member.

An object of the present invention is to provide a fluid operated pulsator for imparting power to a member to be driven, without the use of speed reducing gearing, or other mechanical mechanisms for increasing the leverage between the operating handle of the apparatus and the driven member.

A further object of the invention is to provide a valveless fluid operated power device which is very compact and simple in construction, and has a wide range of use, the inherent construction of the device being such that any desired leverage may be obtained by simply changing the relative diameters of the main fluid chamber and the fluid displacement member, whereby the apparatus is rendered applicable for a great many uses as, for example, lifting jacks, rams, power presses, and many other mechanisms requiring considerable power to transmit motion thereto.

A further object is to provide a fluid operated power device or pulsator comprising a relatively large fluid chamber, having a small cylinder communicating directly therewith, and in which is operatively mounted a fluid displacement plunger which, when operated, will alternately force fluid into and out of the fluid chamber and thereby impart a pulsating action to a wall thereof, whereby a similar action may be imparted to a device connected to said movable wall.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a diagrammatic view illustrating the invention as applied to a lifting member;

Figure 2 is a view showing the pulsator removed from its supporting means; and

Figure 3 is a view showing a pulsator comprising a diaphragm in lieu of the piston shown in Figure 1.

The novel power device herein disclosed, is shown in Figure 1 as comprising a cylinder 2, closed at its lower end, as shown at 3, and having a head 4 detachably secured to its upper open end, as best illustrated in Figure 1.

A piston, generally indicated by the numeral 5, is mounted for reciprocal movement within the cylinder 2, and is shown comprising a flanged head 6 against which a cup-shaped packing 7 is seated and secured by means of a nut 8, received in threaded engagement with the reduced terminal 9 of the piston rod 11. A suitable washer 12 is shown interposed between the packing 7 and nut 8, as is customary in devices of this kind.

The piston rod 11 is provided with a bore 13, in which is mounted a small plunger 14, shown provided with a suitable packing 15. The plunger 14 has an operating rod 20 which protrudes from the upper end of the piston rod 11, and is provided with a suitable handle 16. A suitable packing 17 is provided in the upper end of the piston to prevent leakage around the plunger rod 20. The packing 17 may be secured in position by a suitable packing nut 18. The cap 4 of the cylinder 2 is shown provided with suitable vent openings 19 to permit free circulation of air into and out of the upper portion of the cylinder 2, when the piston 5 is reciprocated within the cylinder.

To illustrate the operation of the invention, there is shown in Figure 1, a lifting member 21 provided with suitable ratchet teeth adapted to be engaged by a lifting pawl 23, pivotally mounted on one end of an arm 24, the opposite end of which is shown pivotally connected to the lower end of the cylinder 2, by a pin 25. The arm 24 is pivotally mounted at the upper end of a suitable post 26 secured to a base 27.

A holding pawl 28 is shown mounted upon the base 27, and is adapted to hold the lifting member 21 against downward movement, when the lifting pawl 23 is lowered or moved downwardly in the operation of imparting upward movement to the lifting member 21. The pawls 23 and 28 are provided with suitable springs for holding them against the ratchet teeth 22 as is customary in devices of this kind. Suitable means, not shown, may be provided for moving the pawls out of engagement with the ratchet teeth of the member 21, to permit lowering of the latter.

In the structure illustrated in Figure 1, the cylinder 2 is adapted for vertical movement relatively to the piston 5, the latter having its piston rod 11 fixedly supported in a suitable standard 29 secured to the base 27.

In the operation of the power device, as illustrated in Figure 1, vertical movement is imparted to the cylinder 2 by reciprocal movement of the plunger rod 20 within the bore 13. When the plunger 14 is moved downwardly from the full to the dotted line position, shown in Figure 1, the fluid in the bore 13 is forced into the cylinder below the piston 5, thereby forcing the cylinder 2 downwardly, because of the piston rod 11 being supported in fixed relation in the standard 29. Such downward movement of the cylinder 2 will rock the arm 24 and thereby cause the lifting pawl 23 to elevate the lifting member 21, as will readily be understood by reference to Figure 1.

Because of the relatively greater diameter of the cylinder 2 with respect to the bore 13, the leverage between the operating handle 16 and arm 24 is greatly multiplied, as will be readily understood by the full and dotted lines, shown in Figure 1. Because of the relatively greater diameter of the cylinder 2, the downward movement imparted to the cylinder upon a full stroke of the plunger rod 20, is very small as compared to the stroke of the plunger rod, and this leverage obviously may be varied by simply changing the diameters of the cylinder 2 and bore 13 to suit the particular type of work for which the power device is designed. No valves are used in the construction of the power device, and there is no transfer of the fluid through a plurality of small ducts or passages, as is common in hydraulic devices now in common use.

In the present structure, the operation of the cylinder 2 is accomplished by the simple displacement of the fluid in the bore 13 by the plunger rod 20, when the latter is moved downwardly. The load carried by the lifting member 21, will exert an upward thrust against the lower end of the cylinder, which will cause the fluid to be forced upwardly into the bore 13, when the plunger rod is retracted. In actual operation, however, it has also been found that the suction created in the bore 13, upon the up-stroke of the plunger rod 20, will cause the fluid to be drawn into the bore, as shown in Figure 1, whereby the cylinder will move upwardly because of the vacuum tending to form therein below the piston.

While I have herein shown the power device as used in connection with a lifting member, such as may be employed in a jack, it is to be understood that it may be used in connection with a great many other mechanisms where it is desired to transmit power to a driven member without the use of gearing or other mechanical speed reducing means for multiplying the leverage between the operating handle 16 and the member to be driven.

In Figure 3, there is shown a slightly modified construction wherein a diaphragm 31 is used in lieu of the piston 5, shown in Figure 1. The diaphragm 31 is shown clamped between two members 32 and 33 by suitable bolts 34. The member 32 is so formed as to cooperate with the diaphragm to define a fluid chamber 35, which communicates with a bore 36, shown provided in a tubular member 37 which, in the present instance, is shown integrally formed with a standard 38, somewhat similar to the standard 29, shown in Figure 1. It is to be understood that the tubular member 37 and also the member 32 may, if desired, be detachably secured to the standard 38 without departing from the scope of the invention.

A rod 39 is suitably secured to the diaphragm 31 and is shown movably supported in a guide 41 provided in the member 33. A member to be driven such, for example, as the arm 24, may be operatively connected to the lower end 42 of the rod 39, as will be readily understood by reference to the drawing.

To actuate the diaphragm 31, a plunger 43 is provided in the bore 36 and has an operating rod 44 protruding from the upper end of the tubular member 37 and provided with an operating handle 45. A suitable packing is provided around the rod to prevent leakage from the member 37.

In the operation of the device shown in Figure 3, the fluid in the bore 36 is displaced by manipulation of the plunger 43, whereby the fluid in the bore is pumped into and out of the chamber 35, thereby to impart up and down movement to the diaphragm 31, and therefore the rod 39.

The structure disclosed in Figure 3, like the one illustrated in Figure 1, is void of valves, and provides a very simple and efficient mechanism for imparting a pulsating action to a member to be driven. Because of the relatively small diameter of the bore 36 with respect to the diameter of the chamber 36, the leverage between the operating handle 45 and the rod 39 is greatly multiplied, and may readily be varied to suit conditions by simply changing the relative diameters of the bore 36 and chamber 35, as described with reference to Figure 1.

The structure is very simple and compact, and comprises few operating parts, and, as previously stated, may be used for a great many purposes where it is desired to greatly multiply the leverage between the operating handle of the device and the member to be driven.

I claim as my invention:

1. The combination with a driven member including a ratchet device for imparting movement thereto, of a pulsator comprising a relatively movable fluid cylinder having an operative connection with said ratchet device, and means for pumping fluid into and out of said cylinder to impart thereto a pulsating action, whereby said ratchet device is operated to transmit motion to the driven member.

2. The combination with a driven member including a ratchet device for imparting movement thereto, of a hydraulically operated pulsator comprising a relatively fixed piston having a fluid cylinder mounted for relative movement thereon and operatively connected to said ratchet device, and means for forcing fluid into and out of the cylinder to impart a pulsating action thereto, whereby the ratchet device is actuated to operate the driven member.

3. The combination with a member to be driven including a ratchet device for imparting a step-by-step movement thereto, of a relatively large cylinder, a piston in the cylinder provided with a hollow piston rod, means fixedly supporting the hollow piston rod and a plunger operable in said piston rod for pumping fluid into and out of the cylnder, thereby to impart a pulsating action to the cylinder, whereby the ratchet device is operated to actuate the driven member, said hollow piston rod providing the sole support for the cylinder.

4. The combination with a member to be driven including a ratchet device for imparting a step-by-step movement thereto, of means for driving said ratchet device comprising a relatively large cylinder having a piston operable therein and provided with a piston rod, said piston rod having a restricted bore therein which is in constant communication with the cylinder, and a plunger operable in said bore for pumping fluid into and out of the cylinder, thereby to relatively move the cylinder and piston rod, thereby to actuate the ratchet device.

HAROLD NILSON.